United States Patent

[11] 3,609,612

| [72] | Inventor | Kurt Tibbling<br>Solna, Sweden |
|---|---|---|
| [21] | Appl. No. | 865,244 |
| [22] | Filed | Oct. 10, 1969 |
| [45] | Patented | Sept. 28, 1971 |
| [73] | Assignee | Asplundpatenter Aktiebolag<br>Tykovagen, Lidingo, Sweden |

[54] CARRIAGE OR TROLLEY FOR TRAVEL ALONG AN UPRIGHT WALL OF MAGNETIC MATERIAL
2 Claims, 3 Drawing Figs.

[52] U.S. Cl. .................................................. 335/289, 114/222
[51] Int. Cl. .................................................. H01f 7/20
[50] Field of Search ....................................... 335/289, 290; 180/6.66; 114/222; 29/81 D

[56] References Cited
UNITED STATES PATENTS

| 2,104,062 | 1/1938 | Temple .................... | 335/290 |
|---|---|---|---|
| 2,132,661 | 10/1938 | Temple .................... | 114/222 X |
| 3,409,854 | 11/1968 | Swallert.................... | 335/289 |

FOREIGN PATENTS

| 184,878 | 8/1922 | Great Britain............. | 335/289 |

Primary Examiner—G. Harris
Attorney—Eric Y. Munson

ABSTRACT: Electromagnetic carriage device designed for traveling along a surface of magnetic material and having runner wheels contacting the surface, each of the runner wheels being mounted within an annular magnet, which is retained at a predetermined distance from said surface by means of the respective runner wheel.

KURT TIBBLING,
Inventor.

KURT TIBBLING,
Inventor.

CARRIAGE OR TROLLEY FOR TRAVEL ALONG AN UPRIGHT WALL OF MAGNETIC MATERIAL

This invention relates to a carriage or trolley intended for traveling along an upright wall of magnetic material.

More particularly this invention relates to a carriage or trolley intended for traveling by its own power along an upright wall of magnetic material and provided with runner wheels for contact with the wall surface, said runner wheels being mounted each within its associated annular magnet which by means of said wheel is retained spaced from said surface for a predetermined distance. The carriage the gravity component of which is carried by the wall by means of the magnetic force can be equipped with tools for performing work along wall surfaces having predominant extension in vertical direction. Thus, the carriage is particularly intended to be used in connection with work on ship's hulls, for example for removal of rust, painting, welding of ship plates and similar operations, in which connection the carriage to advantage can be remotely controlled. The carriage may, however, also be used to convey material or persons, e.g., along a ship'hulls.

One main object of the invention is to ensure that the power supplied from the magnet affords to the carriage or trolley required carrying capacity and guidance with regard to inevitable irregularities existing on a wall surface, primarily projections such as welding joints in a ship's hull, which makes necessary to position the magnet with a predetermined minimum spacing from said surface.

According to one main feature of the invention the runner wheels have a peripheral rim of a resilient, nonmagnetic material and the individual magnets have an annular iron core having cross-sectional contour of a U open towards the wall surface, through which iron core the magnetic circuit is closed without contribution by the runner wheel.

In a preferred embodiment of the invention the magnet core is at its outer well as its inner circumference equipped with brushes of magnetic material totally or at least almost totally bridging over the air gap between said core and said wall surface.

Further objects and advantages will become apparent from the following description, considered in connection with the accompanying drawings which form part of this specification and of which:

Figure 1:
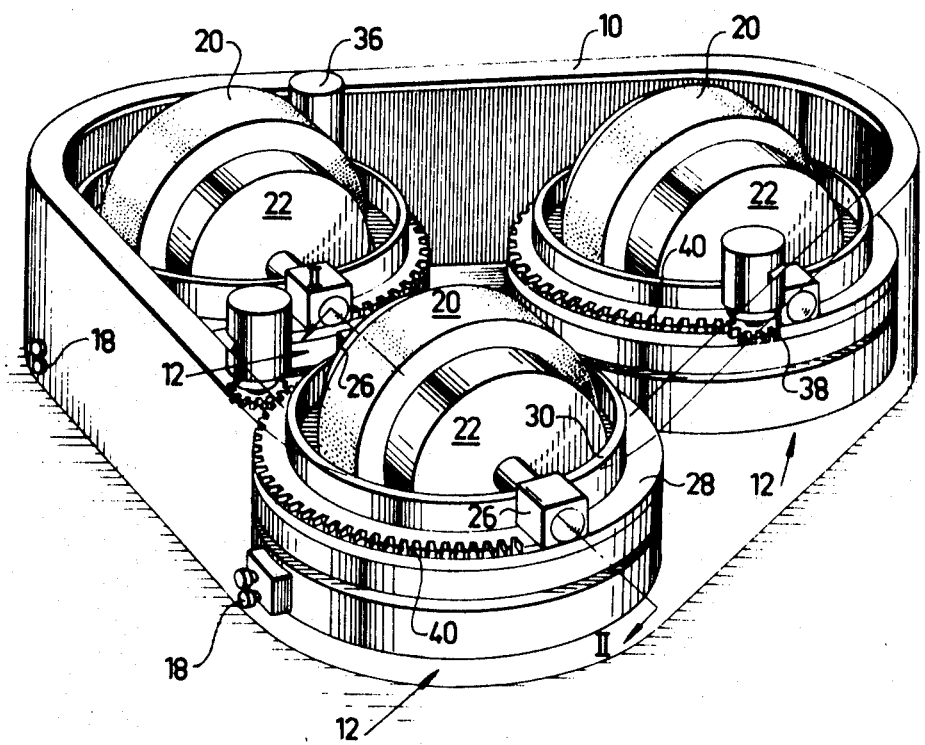
FIG. 1 is a perspective view of a carriage or trolley embodying the features of the invention and with a portion of a frame assumed cut away for improved clearance.
Figure 2:
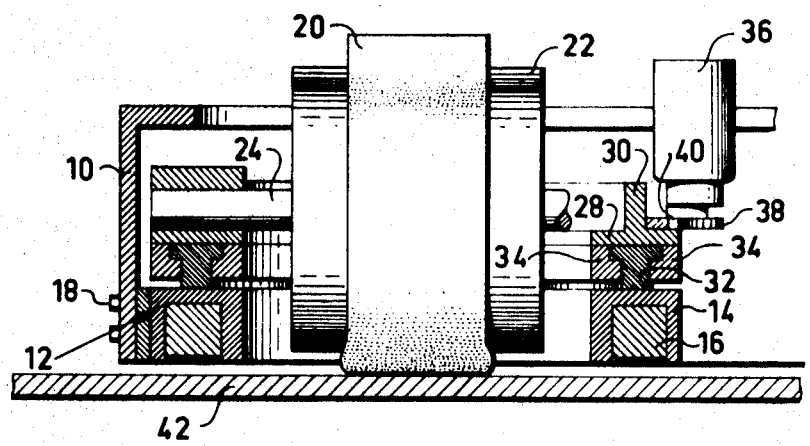
FIG. 2 is a sectional view following line II—II of FIG. 1
Figure 3:
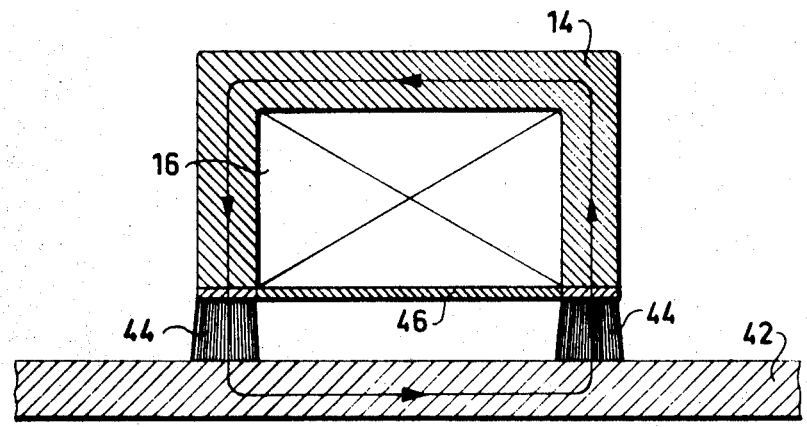

FIG. 3 is a cross-sectional view of a portion of a wall and a magnet according to a modified embodiment of the invention With reference to the embodiment shown in Figs. 1 and 2, reference numeral 10 denotes a carriage frame in which three magnets 12 are fastened by means of screw connections 18. Each magnet consists of an annular iron core 14 having in its cross section a contour of an inverted U, according to Fig. 2, and an annular excitation winding 16 supplied with electrical current through conduits not shown.

Mounted within each magnet 12 is a runner wheel 20 having a rim or peripheral running zone made of rubber or some other resilient, non magnetic material. The runner wheel is mounted on a cylinder 22 housing a motor (not shown) for rotating the wheel 20. The cylinder is thus rigidly connected with the wheel 20 and the rotating part of the motor. The motor is supported by a shaft 24 the ends of which are introduced into fastening means 26 fixed onto an annular element 28 provided with a central reinforcing flange 30. Rigidly mounted onto each magnet 12 is a suitable T-shaped bearing ring 32 formed for cooperation with the annular element 28 and an annular element 34 connected therewith, between which parts sliding surfaces adapted for mutual cooperation are provided and render possible part rotation of the annular elements 28, 34 and the runner wheel 20 while these parts are guided in all directions. The center of the part-rotational movement coincides with the central axis of the magnet. The part rotation of the wheel is brought about by a separate motor 36 for each wheel 20 which motor is mounted on the frame 10 and drives a gear 38 which in turn engages a gear rim 40 extending over e.g. about a third of the circumference of the annular elements 28. By means of this device each runner wheel can be rotated individually within its magnet 12 through an angle of e.g. 120° for changing the direction of movement of the carriage according to desire.

The runner wheels 20 are intended to roll on the surface of a wall 42 of iron or steel, the sides of the magnets 12 facing said surface being kept spaced from said wall surface for a distance exceeding occurring irregularities and projections on said surface, such as e.g. welding joints between ship's plates connected with one another or the like. Each magnet exercises a tractive force on the vertically extending wall support which is transferred to the wheel in the form of a frictional force causing the carriage to be retained in its position on the vertical surface. When dimensioning the magnet one has to take into account the reduction of the effective magnetic force resulting from the magnitude of the airgap between the magnet and the wall surface and the lowest friction coefficient which normally can exist between the wheel and e.g. a ship's board when the latter is newly painted or wet. By providing a power-supply-controlling sensing device of known kind for each magnet the electric current passing through the magnet coil 16 can be controlled and if necessary adjusted continuously so that the effect of the force acting between the runner wheel and the support is kept practically constant. In this way the frictional force of each wheel is utilized as effectively as possible. Further, the average level of the magnets over the support can be kept constant so that welded joints and other limited projections will be absorbed by the elastic tire and the magnet will be allowed to float at substantially the same level over the surface even when projections of a magnitude of 4 to 6 millimeters are passed over. Further, a compensation for changes in the location of the center of gravity can be obtained by the current-supply-controlling sensing device when the carriage is advanced in varying directions or when tool equipment mounted on the carriage is changed in its location on the carriage. Such tool equipment may consist of striking tools for removal of rust or nozzles for painting by spray action. The carriage may be given such dimensions that it each time it travels in one direction over the wall surface treats a strip having a breadth of 1 to 2 meters.

Supply of electric current, compressed air or pressure oil as well as the control of the carriage are effected through a cable (not shown) which suitably is suspended from above when a vertical wall is to be worked upon, so that the carriage is not loaded by the whole weight of the cable. The carriage may also be quipped with a running-out safety line which takes over the weight of the carriage when supply of current is interrupted for some reason. The control of the movement of the carriage may be effected from a panel situated at a suitable place. By means of a television camera mounted directly on the carriage a clear image of the area of operation can be obtained when e.g. painting or welding is effected.

The control and guidance of the carriage can be effected entirely manually by visual supervision or by means of guiding according to position along or through a weld joint or groove, color edges or a ray of light. It is also possible to utilize some kind of inertial navigation. Sensing devices for indication of obstructions in the way of the carriage or sensing devices measuring the thickness of the paint and similar devices can be carried by, or connected to, the carriage.

Each magnet requires relatively limited real power such as 400 w., the whole carriage thus together 1,200 w. This relatively low want of power renders possible that to complete the equipment for current supply by batteries as additional safety means against possible interruption of the supply of current from the main.

The embodiment according to Fig. 3 differs from the preceding one by steel brushes 44 being disposed in the airgap between the poles of the iron core 14 and the support surface 42. A protective layer 46 is disposed below the coil winding 16. The steel brushes follow the lines of force of the magnetic flow along the inner and outer circumferences of the annular iron core. Hereby the losses in the two airgaps are reduced so that the rigid parts of the magnet can flow at a higher level over the steel plate 42 with the tractive force acting on said plate being maintained at a substantially constant level. The steel brushes 44 allow without difficulty weld joints and other projections to be passed over below the magnet when this is displaced with the supporting carriage, the brushes then giving way in lateral direction to regain thereafter their prior position. For surface-working machines and the like the airgap between the iron core and the wall surface may in this embodiment be up to 10 millimeters and still more.

According to a conceivable, though less advantageous, embodiment the carriage may have four wheels between which a magnet is mounted.

While several embodiments of the invention have been shown and described, it is to be understood that this is for purpose of illustration only and that the invention is not to be limited thereby, but its scope is to be determined by the appended claims.

What is claimed is:

1. A carriage intended for traveling by its own force along an upright wall of magnetic material and provided with runner wheels for contact with said wall surface, each of said runner wheels being part-rotatably mounted within its associated annular magnet, which by means of said wheel is retained spaced from said surface for a predetermined distance, characterized in that the runner wheels have a peripheral rim of a resilient, nonmagnetic material and that the individual magnets have an annular iron core having a cross-sectional contour of a U opening towards said wall surface through which core the magnetic circuit is closed without contribution by the runner wheel.

2. A carriage as claimed in claim 1, characterized in that the annular magnet core at its outer as well as its inner circumference is equipped with brushes of magnetic material which partially bridge over the airgap between said core and said wall surface.